United States Patent

[11] 3,584,810

| [72] | Inventor | Edward J. Velton |
| | | La Mesa, Calif. |
| [21] | Appl. No. | 822,917 |
| [22] | Filed | May 8, 1969 |
| [45] | Patented | June 15, 1971 |
| [73] | Assignee | General Dynamics Corporation |
| | | San Diego, Calif. |

[54] STACKED ROTOR VTOL AIRCRAFT
8 Claims, 12 Drawing Figs.

| [52] | U.S. Cl. | 244/23 |
| [51] | Int. Cl. | B64c 27/20 |
| [50] | Field of Search | 244/12, 23, 7 |

[56] References Cited
UNITED STATES PATENTS

| 2,966,318 | 12/1960 | Chodan | 244/23 |
| 3,103,327 | 9/1963 | Parry | 244/23 |

*Primary Examiner*—Milton Buchler
*Assistant Examiner*—Steven W. Weinrieb
*Attorneys*—Neil F. Martin and Carl R. Brown ABSTRACT: A stable tail setter VTOL aircraft having forward and aft powered lifting rotors that straddle the airframe center of gravity such that the trim attitude and stability of the aircraft can be regulated by controlling the relative thrusts produced by each of the individual lifting rotors and the aircraft can be maneuvered about the established trim attitude by use of control surfaces located in the downwash of the lifting rotors.

PATENTED JUN 15 1971

INVENTOR.
EDWARD J. VELTON

BY Neil F. Martin

ATTORNEY

PATENTED JUN 15 1971

INVENTOR.
EDWARD J. VELTON

BY Neil F. Martin

ATTORNEY

*INVENTOR.*
EDWARD J. VELTON
BY

ATTORNEY

STACKED ROTOR VTOL AIRCRAFT

BACKGROUND OF THE INVENTION

There are several known types of VTOL aircrafts. These VTOL aircrafts have particular advantages over fixed wing aircraft and have experienced increased use where their hover capability is desired. However there are no VTOL aircraft presently available that are inherently stable. While VTOL aircraft have some degree of stability where there is no relative wind, such aircrafts and especially those employing rotor propulsion, experience disturbing moments when acted upon by relative wind. The relative wind causes interactions with the aircraft's thrust producing element and these interactions cause, among other things, torques or moments on the airframe. These moments result primarily from the momentum drag experienced in deflecting the horizontally moving air mass downward in providing upward thrust. Thus conventional VTOL aircraft experience nose up moments since their rotors are located above the airframe's center of gravity, and these moments will cause an oscillatory or static divergence unless the pilot or the autopilot takes corrective action. In known VTOL aircraft it is left to the pilot to make corrections through his controls to compensate or control the flight deviations resulting from these moments. Thus the pilot controls in known VTOL aircraft function to manipulate the force distribution of the primary lifting element or the auxiliary thrust producing elements. Because of the complexity of the known VTOL aircraft, the work load and the skill requirements of VTOL pilots exceed those of fixed wing pilots.

Also in addition to the difficult flight control problem of existing VTOL aircraft, such aircraft have the limitation of being relatively expensive and complicated. Known aircraft having VTOL hover capability normally either employ fixed wingtype lift in normal flight or are helicopter-type aircraft. The hover capability of such aircraft is primarily to move the aircraft from a limited space on the ground into the air, where such aircraft have to achieve a certain minimum altitude of flight in order to safely maneuver. Also helicopter-type aircraft have relatively large rotors that must not contact trees, foliage, or the like and are limited by the required altitude-velocity relationship of autorotation mode of engine-out flight.

Thus it is desirable to have a VTOL aircraft that is simple and inexpensive in construction, has a simple set of pilot controls, is easy to fly and is inherently stable so that any moments generated by winds will be automatically cancelled out by the aircraft without requiring action on the part of the pilot or without resorting to autopilot control.

SUMMARY OF THE INVENTION

In a preferred embodiment of this invention, a stable tail setter VTOL aircraft has a pair of stacked and spaced lifting rotors. These rotors are connected together by a relatively simple and uncomplicated frame structure that separates the rotors into forward and aft powered lifting elements that straddle the airframe and the center of gravity of the airframe. The rotor lifting elements may be powered by a single engine or by separate engines. The thrust provided by the rotor lifting elements is selectively variable by either controlling the power supplied to each of the rotors, when the rotors have a fixed pitch angle or selectively varying the pitch angle of each of the rotors when a single power plant is used. As the rotors rotate in concentric parallel planes, the wind from the forward rotor is directed toward the spaced aft rotor. While the VTOL aircraft has control surfaces operated by the pilot to provide maneuver about trim in pitch, roll and yaw, the aircraft's trim attitude is regulated, modulating the thrust distribution between the forward and aft rotor lifting elements. This control, as previously described, may be accomplished through a power distribution control that maintains a constant sum of upper and lower rotor thrust to maintain a given attitude of flight.

By regulating the power distribution between the upper and lower lifting rotors, the VTOL rotor aircraft of this invention can be made stable, referenced to the relative wind, at any speed including hover. To translate the aircraft, the trim attitude of the thrust axis is tilted to produce a horizontal thrust vector in the desired direction. This is accomplished by varying the thrust of the respective rotors. In general, increasing the relative thrust of the aft rotor decreases the angle between the thrust axis and the wind vector at which the aircraft trims, while increasing the relative thrust of the top or forward rotor increases the angle between the thrust axis and the wind vector at which the aircraft trims. This is accomplished by utilizing the by-products of thrust, namely, momentum drag and downwash. These products are generated by the interaction of the relative wind and the lifting elements and are controlled through power distribution between the two lifting rotors to cancel out their effect on the airframe. In addition, using two or more lifting elements in tandem, the interaction between the lifting elements caused by the effects of downwash from the forward lift element on the other established a relationship between trim angle of attack and the power distribution. Thus for each relative thrust setting for each rotor lifting element, a trim angle of attack exists that causes the aircraft to rotate to that trim angle and remain at that angle in a stable condition at the relative velocity established by the trim angle.

The stacked rotor aircraft of this invention does not experience the inherent disturbing moments that the relative wind creates in known rotor VTOL aircraft. Once the stacked rotor aircraft of this invention is set for a stable condition, movement of the aircraft away from this stable condition without operation of the controls of the aircraft, tend to create forces and moments that returns the aircraft to its original stable velocity and attitude without requiring any action on the part of the pilot. Thus this aircraft is much simpler to fly than existing rotor borne VTOL aircraft as well as those aircraft employing reaction control or antitorque rotors. Also the stacked rotor aircraft of this invention employs relatively small diameter rotors, with enclosing shrouds that provide a rigid structure that may be flown close to the ground surface where possible contact may be made with foliage of trees and the like. The aircraft can use two engines and thus it is feasible to fly in close proximity to the ground because of the substantial elimination of the required altitude-velocity relationship that is associated with autorotation mode of engine-out flight. This invention provides a very inexpensive and easy to fly VTOL aircraft with considerably improved hover capabilities and stability that has many civilian and military applications.

It is therefore an object of this invention to provide a new and improved VTOL-type aircraft.

It is another object of this invention to provide a new improved VTOL-type aircraft that is relatively easy to fly, is inexpensive to make and that has a relatively small size that allows the aircraft to be used in many close to ground applications.

It is another object of this invention to provide a new and improved VTOL-type aircraft that is inherently stable and does not experience the instability that is experienced by other known rotor borne VTOL aircraft when subjected to a relative wind.

It is another object of this invention to provide a new and improved VTOL-type aircraft that employs multirotor lifting devices powered by separate engines providing increased safety and providing a simplified aircraft structure that eliminates engine cross shafting and collective power pitch controls and that has a simple set of pilot controls that does not require mixing boxes, and which aircraft has increased stability and lack of exposed rotating elements.

Other objects and many attendant advantages of this invention will become more apparent upon a reading of the following detailed description and an examination of the drawings wherein like reference numerals designate like parts throughout and in which.

Figure 1:
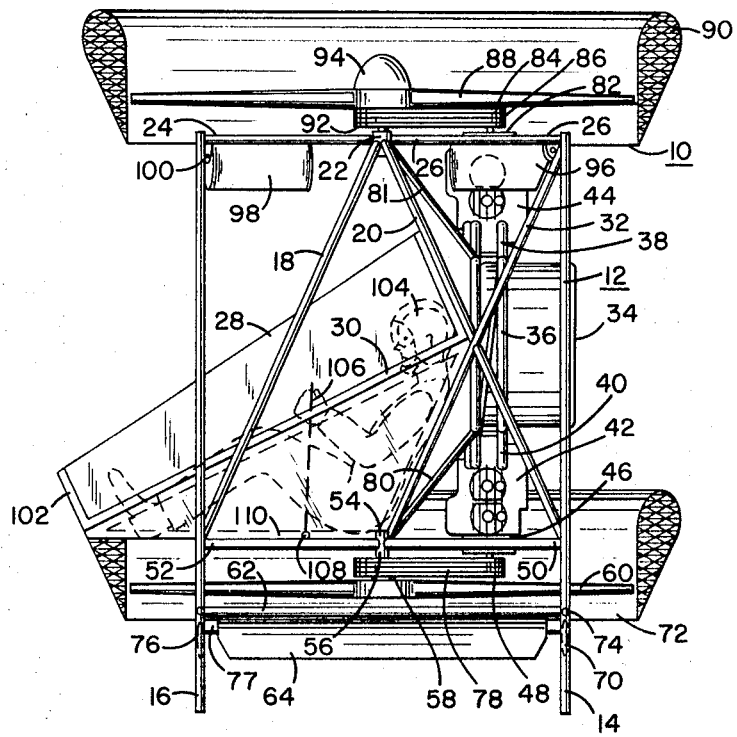
FIG. 1 is a side elevational view with parts broken away of an embodiment of this invention.
Figure 2:
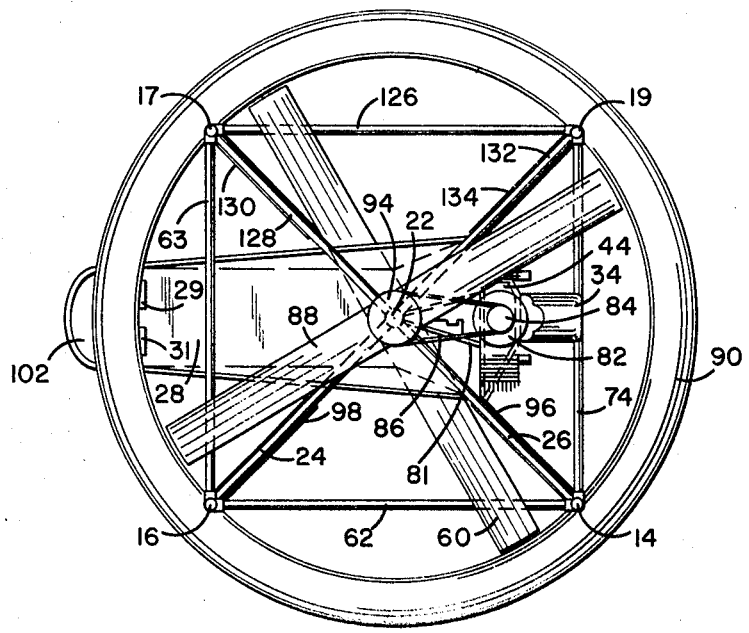
FIG. 2 is a top view of the embodiment illustrated in FIG. 1.
Figure 3:
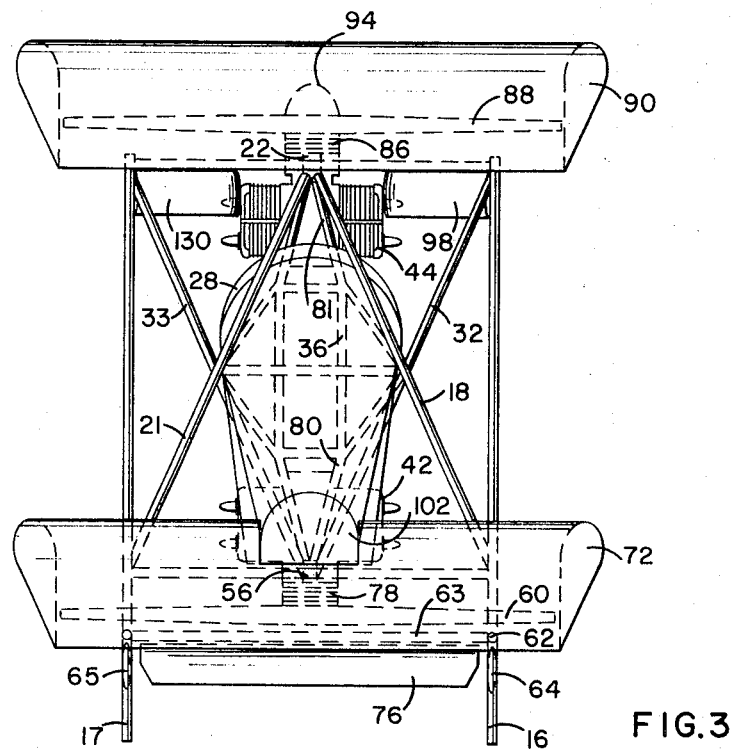
FIG. 3 is a front elevational view of the embodiment of the invention illustrated in FIGS. 1 and 2.

Referring now to FIGS. 1, 2, and 3, the VTOL stacked rotor aircraft 10 has a frame structure 12 of tubing, that may be made of aluminum or other suitable materials. In the frame structure 12, four vertical tubes 14, 16, 17 and 19 are interconnected by angled members, as for example members 18 and 20. The angled members 18 and 20 intersect at point 22 and support the known bearing structure of an upper V-belt pulley 92. Crossmembers, as for example members 52 and 50, are connected at one of their ends to the vertical members 14, 16, 17 and 19 and extend radially inward to support a lower bearing support member 54 of the lower V-belt pulley 58. In addition, angled members 32 and 33 function with pairs of vertical members, 80 and 81 to support an engine frame supporting structure 36. A gas tank 34 is supported in the engine frame structure as illustrated. The upper engine 44 propels an upper rotor 88 through a pulley and drive mechanism employing V-belt pulleys 84 and 92 and V-belts 86. The drive pulley 84 and the engine 44 are additionally connected by plate 82. The lower engine 42 drives through drive connection 46, pulleys 48 and 58 and V-belt 78. The lower center pulley 58 rotates the lower rotor 60.

Figure 12:
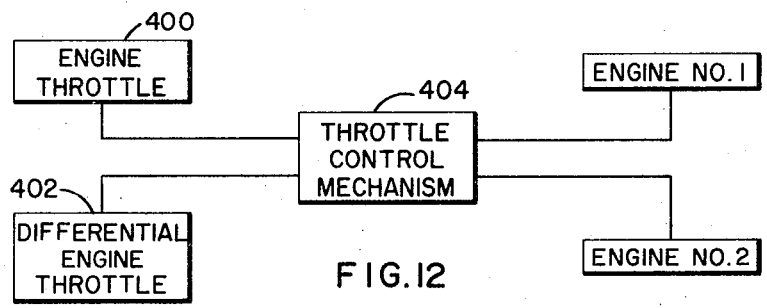
FIG. 12 is a block diagram of the pilot controls for controlling the throttle mechanism to the pair of engines in the embodiment of this invention.

A pilot compartment 28, having a frame structure 30 and a transparent covering, is supported on the previously described frame structure. It may be observed that the end 102 of the pilot canopy 28 extends outwardly beyond the edge of the lower propeller shroud 72 and foot peddles 29 and 31 are provided for moving appropriate control surfaces that will be described hereinafter. The pilot 104 has access to a throttle control 106 that passes through an opening 108 in the canopy 28 and is connected to the throttle mechanism for controlling the operation of the engines 42 and 44. The pilot controls the engine throttle 400, see FIG. 12, through the throttle control mechanism 404 that controls the combined thrust of the forward rotor 88 and the aft rotor 60. The pilot also has a differential control 402 that provides differential engine throttle control through throttle control mechanism 404 for selectively increasing the power of one of the engines 42—44 while decreasing the power of the other engine. The throttle control mechanism may be any suitable known differential throttle control mechanism. In operational control of the throttle, it is desired that the relative engine thrust of engine 1 and engine 2 may be selectively adjusted without adjusting the total composite thrust provided by both engines.

Figure 4:
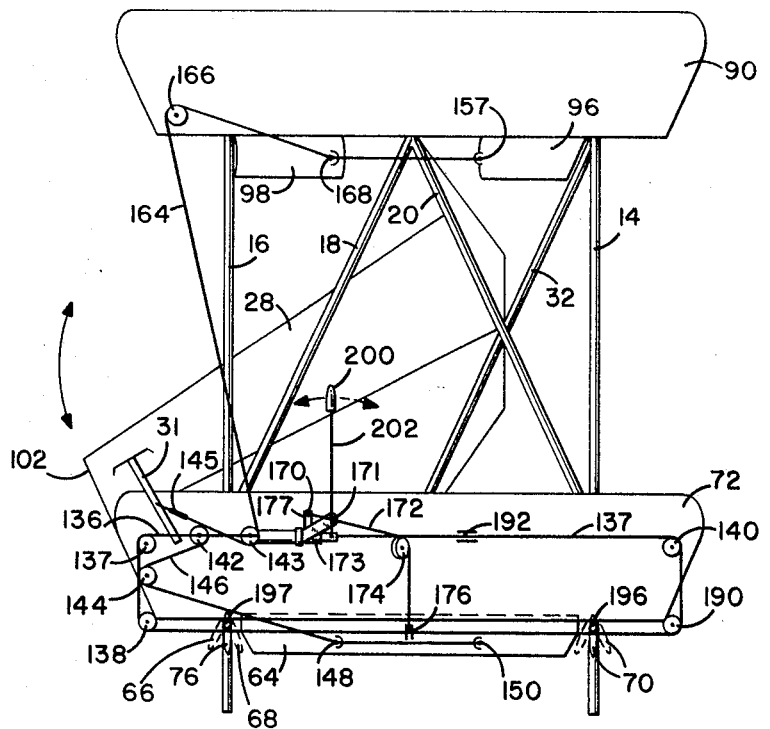
FIG. 4 is a side elevational view of a schematic illustration of an embodiment of the invention illustrating the means by which the pilot controls the control surfaces.

The aircraft 12 has an upper shroud 90 and a lower shroud 72 that are secured to vertical rods 14, 16, 17 and 19. The shrouds 72 and 90 have an internal diameter that is only slightly larger than the length of the rotors 60 and 88, thus forming an enclosure for the rotors 88 and 60. It should be understood that the rotors 60 and 88 may provide their thrust producing function without the necessity of the shrouds 72 and 90. However the shrouds 72 and 90 do improve the thrust producing performances of the rotors and further provide protection of the rotors from contacting other objects and personnel. The shrouds 72 and 90 may be made of any suitable material and preferably are made of metal or plastic honeycomb with fiberglass outer skins. The control vanes, as for example control vane 64, may be made by covering contoured foam with fiberglass or using other known construction techniques that provide light weight and strong vane structures. The control vane 64 is supported for pivotal movement on rod 77 and the other control vanes are in turn supported on similar pivotal supports. A box frame is positioned immediately above the control vanes and comprises members 62, 74, 126 and 63. The upper yaw control vanes, for example control vane 98, is supported on a known pivoting structure that is secured to the cross rod 24. Dotted lines 66 and 68 of FIG. 4, illustrate the in and out pivotal movement of the control vane 76.

Figure 5:
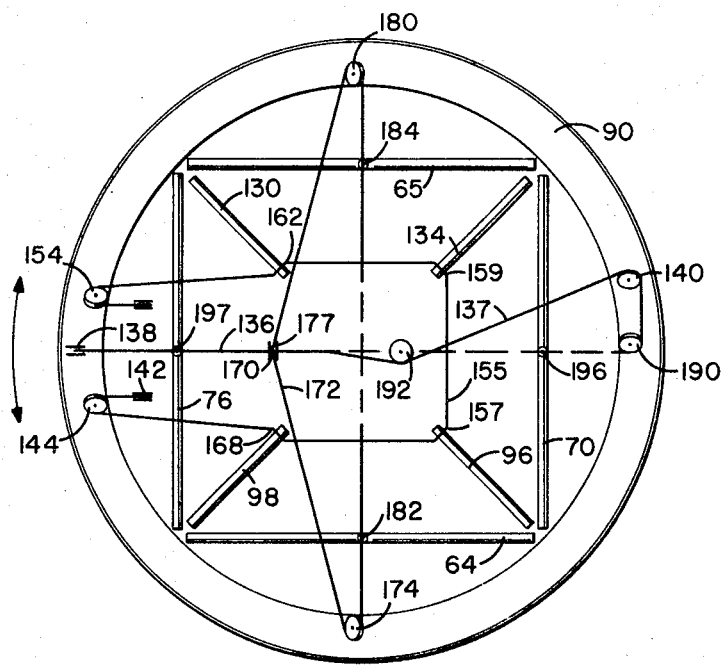
FIG. 5 is a top view of a schematic illustration of the embodiment of the invention illustrating the means by which the pilot controls the control surfaces.
Figure 6:
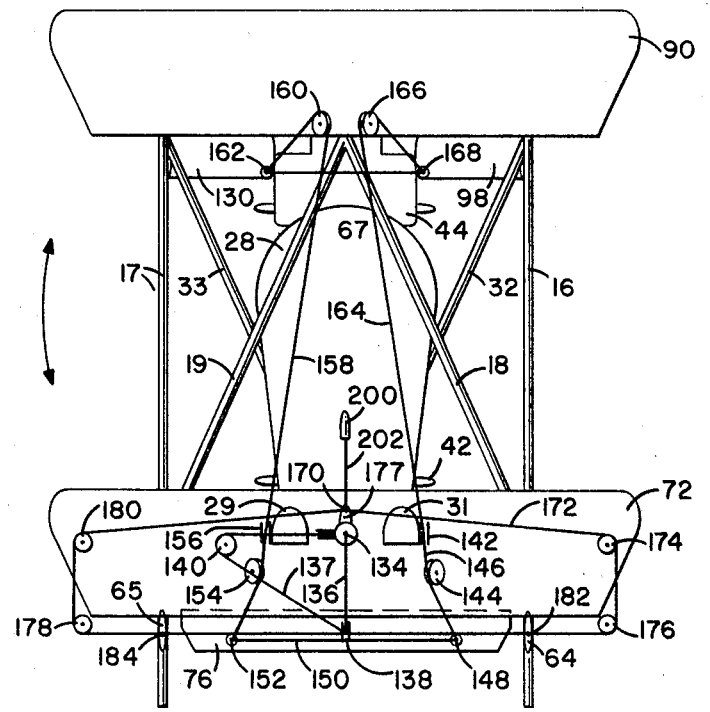
FIG. 6 is a front elevational view of a schematic illustration of an embodiment of the invention illustrating the means by which the pilot controls the control surfaces.

In the operation of the attitude and flight control surfaces, control vanes 64 and 65 provide roll control, vanes 70 and 76 provide pitch control and vanes 96, 98, 130 and 134 provide yaw control. In addition, there is another set of control vanes, not shown, exactly like yaw control vanes 96, 98, 130 and 134 located at the exit of the bottom shroud. The flight control vanes are controlled by the pilot through normal stick and foot controls in the manner that does not require complicated mixing boxes. Referring to FIGS. 4, 5, and 6, the pilot controls the pitch control vanes 70 and 76 by moving the stick 202 in the fore and aft directions by means of handle 200. The stick pivots around a pivot member 171 and moves rod 173 longitudinally, moving cable 136 around pulleys 137, 138, 190, 140 and 192. The cable 136 is connected at points 196 and 197 to the respective pitch control vanes 70 and 76, thus pivoting these vanes in the forward and reverse directions. This movement of the vanes in the vertical air stream passing through the upper shroud 90 and the lower shroud 72, provides deflection control of the air to rotate or pitch the craft in a forward or aft direction. The roll control panels 64 and 65 are controlled through cable connections 182 and 184 with cable 172 that is moved by sideward movement of the stick 202 by the pilot 104. Side movement of the connector 170 that is connected to the upper arm 177 moves the cable 172 on pulleys 174, 176, 178 and 180.

The upper yaw control vanes 96, 98, 130 and 134 and the lower yaw control vanes are controlled through movement of the foot pedals 29 and 31 by the pilot. Movement of the pedals moves cables 158 and 164 around pulleys 160 and 166, which cables interconnect at points 162, 168, 157 and 159 to the respective upper yaw control vanes 130, 98, 96 and 134. The foot pedals 29 and 31 also moves cables 146 and 150 around pulleys 144 and 154, which cables interconnect in a similar manner the yaw control vanes, not shown, of the exit of the lower shroud. These vanes are moved in unison in the same manner as the upper yaw vanes 96, 98, 130 and 134. Movement of these vanes in unison provides a given vane control surface to the wind passing through shrouds 90 and 72 to control yaw of the aircraft and also to control rotational forces that may arise as a result of different rotational speeds between the rotors 60 and 88, which rotors 60 and 88 rotate in opposite directions.

In flight, the pilot controls the throttle and vane controls in the following manner. A common throttle lever is operated by the left hand of the pilot. Movement of the throttle accelerates both engines simultaneously. A second left-hand operated controlled lever functions to reduce the power in one engine and to increase the power in the other engine for differential thrust control. The right hand moves the pitch an roll control vanes and the right and left feet of the pilot provide differential control of the yaw vanes in the manner previously described.

Figure 7:
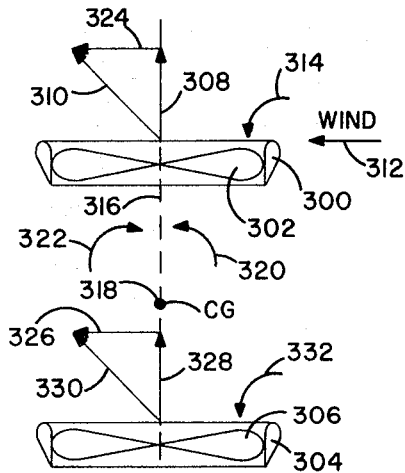
FIG. 7 is a schematic illustration illustrating the forces and moments acting on the stacked rotor VTOL aircraft of this invention in vertical flight position.
Figure 9:
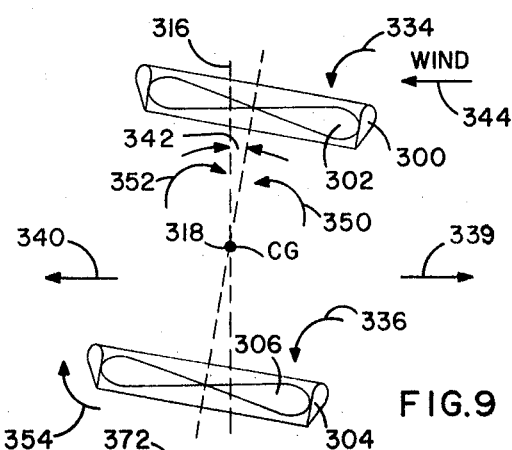
FIG. 9 is a schematic illustration of the forces and moments acting on a stacked rotor VTOL aircraft of this invention in an attitude where the airframe is tilted to produce horizontal acceleration.
Figure 10:
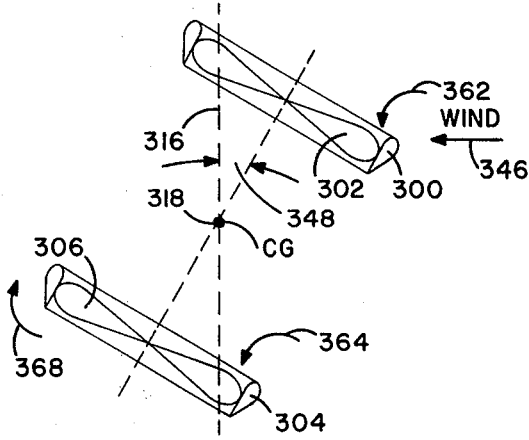
FIG. 10 is a schematic illustration of the stacked rotor VTOL aircraft and the wind and force moments thereon in flight through the wind.
Figure 11:
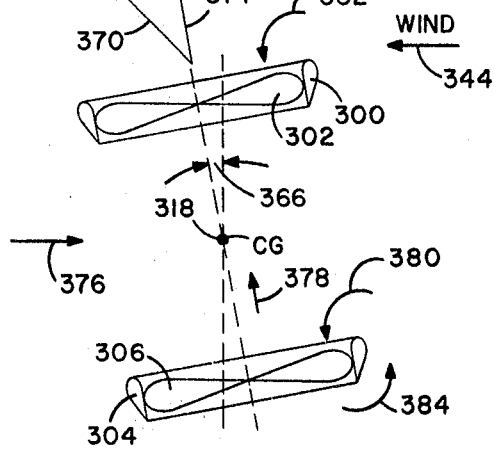
FIG. 11 is a schematic illustration of the VTOL stacked rotor aircraft with thrust and wind moments, in flight in the direction of the relative wind.
Figure 8:
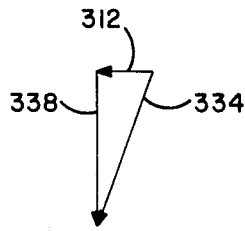
FIG. 8 is a velocity diagram showing the vector summation of velocities that act on the lower lifting rotor of the stacked VTOL rotor aircraft of this invention under flight conditions as illustrated in FIG. 7.

In flight, the trim attitude of the aircraft is established by regulating the relative thrusts of the forward and aft rotors. In general when greater power is applied to the upper rotor, the aircraft noses up tending to increase the angle between the wind vector and the thrust vector. When increased power is applied to the lower vector, the aircraft noses down, tending to decrease the angle between the wind vector and thrust vector. The method of trim angle control of the aircraft is illustrated in FIGS. 7 through 11. Referring to FIG. 7, the lifting elements of the schematically illustrated aircraft are divided into a forward or upper rotor 302 and shroud 300 and a lower or aft rotor element 306 and shroud 304 in vertical attitude condition. As previously stated, the rotors need not employ the annular airfoils or shrouds 300 and 304 and whether or not the annular airfoils are employed depends upon the degree of stabilization required for a particular aircraft design and to provide protection for the rotors. With both engines operating and the rotors rotating in opposite directions and producing substantially the same thrust, the rotor lift elements provide forward and upward thrust vectors 308 and 328. The thrust of the upper shroud rotor combination produces a downwash velocity 338, see FIG. 8, which is vectorially summed with the free stream velocity 312 to produce a total velocity 334 which acts on the lower shroud.

When the aircraft experiences a relative wind in the direction of arrow 312, byproducts of wind and thrust are experienced. The rotors 302 and 306 deflect the relative wind downwardly as illustrated by the streamlines 314 and 332. In the act of producing thrust, momentum drag forces 324 and 326 are created. The vectorial summation of these momentum drag and thrust forces produce the resulting force vectors 310 and 330 of FIG. 7. It is these resulting force vectors that produces moments about the airframe center of gravity 318. Since this resulting force vectors always are inclined away from the relative wind, and since the forward and aft lifting elements straddle the aircraft center of gravity 318, the moment producing effects of the forward and aft lifting elements are opposite in sense. In other words, the forward lifting element produces a positive moment indicated by the arc 320 tending to increase the aircraft's angle of attack whereas the aft lifting element produces a negative pitching moment indicated by the arc 322 that tends to decrease the aircraft's angle of attack. By controlling the power distribution between the forward and aft lifting elements, the degree of stability or instability can be controlled, since the magnitude of the resultant force vectors 310 and 330 increase or decrease depending upon the power increases or decreases applied to the upper or lower rotors respectively. The aft lifting element 306 is located in the downwash of the forward lifting element 302. The total velocity vector acting on the aft lifting element 306 is the vectoral summation 334 of the free stream velocity 312 and the downwash velocity 338 from the forward lifting element. Since the free stream velocity 312 varies with the angle of tilt of the thrust axis, the vectorial summation 334 acting on the aft shroud 304 also varies with the angle of tilt of the thrust axis. The force vectors 326 and 328 of the aft lifting element also vary with the velocity vector 334. Therefore the moment 332 generated by their vectorial summation 330 also varies with tilt angle. This establishes a unique relationship between the moments produced by the two lifting elements such that for each relative power distribution there is an associated trim angle of attack.

The previous description of FIG. 7 describes a hovering case subjected to a gust, relative wind 312. To control the aircraft's position in a steady state wind 344, the aircraft is rotated or trimmed to a tilt angle 342, see FIG. 9. This is accomplished by increasing the thrust on the lower rotor 306 and decreasing the thrust on the upper or forward lifting element 302. This increased thrust creates an increased momentum torque 352 on the aft lifting element 306 and a decreased torque 350 on the upper lift element. This causes the aircraft structure to rotate or pitch in the direction of arrow 354 into a slight angle into the wind because the negative pitching moment 352 has momentarily become larger than the positive pitching moment 350 around the center of gravity 318 of the aircraft. The aircraft rotates to a new stable position at which point the torques produced by the two lifting elements balance out. In this pitched condition, the angle of attack has decreased and a horizontal force vector 339 is created. In the case illustrated in FIG. 9, this force vector 339 is assured to be equal and opposite to the drag 340 produced by the steady state wind 344. The aircraft does not move forward into the wind but rather holds a static position relative to the ground.

When it is desired to move the aircraft in a given direction, such as into the steady state wind 344, then the thrust of the aft lifting element 306 is further increased relative to the forward lifting element 302. This creates a moment unbalance 368, FIG. 10, that rotates the aircraft to a greater tilt angle 348 at which point the torques from the two lifting elements again balance out. A new trim point has been established. However in this case the relative wind 346 is greater than the speed of the steady state wind 344 and a forward motion of the aircraft into the relative wind occurs. When it is desired to move the aircraft in the opposite direction or away from the steady state wind 344, then the thrust of the forward lifting element 302 is increased to a greater magnitude than the thrust of the aft lifting element 306. This causes the positive pitching moment to exceed the negative pitching moment and causes the aircraft to rotate in the direction of arrow 384, FIG. 11. A horizontal thrust vector 372, which is in the same direction as the relative wind 344, is produced. At some tilt angle 366, a trim condition is again reached. Eventually the aircraft will travel in the direction of the steady wind 344 and at an even greater velocity, due to the tilt angle 366 which produces a horizontal thrust vector in the direction of the steady state wind. Eventually a relative wind 376 in the opposite direction of the steady state wind 344 is produced.

While the control of the aircraft trim condition is by means of controlling the relative thrust of the fore and aft lifting devices 302 and 306, it should be understood that the aircraft maneuvers about given flight or trim conditions and rolling of the aircraft and controlling yaw of the aircraft are accomplished by the aforesaid pitch, roll and yaw controls by the pilot in the manner previously described. In the embodiment of this invention, the upper and lower rotors are propelled by separate engines. However these rotors may be controlled and operated by a single engine and the relative thrust controlled by variable pitch propeller control mechanisms. Yet as previously described, it is an essential element of this invention that the VTOL stacked rotor aircraft be of the ultimate in simplicity of operation and structure, which is provided by separately controlled engines for each rotor lifting element.

Having described my invention, I now claim:

1. A VTOL aircraft comprising, an airframe, upper and lower rotor lifting elements journaled on said airframe adapted to be rotated in opposite directions in substantially parallel planes at substantially equal speeds, substantially equal sized upper and lower annular shrouds spaced along a common axis on said airframe fixed to said airframe, said upper rotor lifting element rotatable within said upper shroud, said lower rotor lifting element rotatable within said lower shroud, a pilots' enclosure mounted on said airframe intermediate said upper and lower rotor lifting elements substantially on said axis, engine means for rotating each of said rotor lifting elements, said engine means located in the space between said upper and lower shrouds and having upper and lower power output means extending into the space surrounded by said upper and lower shrouds and spaced from said axis, drive means operatively connecting said upper and lower power output means to said upper and lower lifting rotor elements, and control means operable to selectively vary the thrust of said rotor lifting elements relative to each other.

2. A VTOL aircraft as claimed in claim 1 in which, said rotor lifting elements have fixed, nonmovable positions on said airframe.

3. A VTOL aircraft as claimed in claim 1 in which, the axis of rotation of each of said rotor lifting elements are on the same axis, and each rotor lifting elements is fixed to provide thrust in the same direction.

4. A VTOL aircraft as claimed in claim 1 in which, said airframe has a width that is only slightly larger than the diameter of said rotor lifting elements.

5. A VTOL Aircraft as claimed in claim 1 in which, said control means has first means for selectively setting the sum of the thrust of said rotor lifting elements and second means for differentially varying the thrust of each of said rotor lifting elements.

6. A VTOL aircraft as claimed in claim 1 in which, said rotor lifting elements are fixedly secured to said airframe in in-line positions, said engine means rotates each of said rotor lifting elements in a rotational direction to provide thrust along a common axis, one of said rotor lifting elements receives the downwash from the other rotor lifting elements, and said airframe is open to pass relative wind to said one of said rotor lifting elements.

7. A VTOL aircraft as claimed in claim 6 including, air vanes positioned in the thrust generated by said rotor lifting elements, and means for selectively positioning said vanes to provide pitch, roll and yaw control of said aircraft.

8. A VTOL aircraft as claimed in claim 7 in which, said vanes for providing pitch and roll control are positioned in the downwash of said one of said rotor lifting elements.